United States Patent [19]
Takamori et al.

[11] Patent Number: 5,980,407
[45] Date of Patent: Nov. 9, 1999

[54] SPROCKET AND BRAKE DISC HAVING A FUNCTION TO PREVENT A WARPAGE

[75] Inventors: Norihiko Takamori, Kyoto; Fumihiko Metsugi; Akihito Ohata, both of Otsu, all of Japan

[73] Assignees: Sunstar Engineering Inc., Osaka, Japan; Uni-Sunstar B.V., Amsterdam, Netherlands

[21] Appl. No.: 08/875,583

[22] PCT Filed: Jan. 31, 1996

[86] PCT No.: PCT/JP96/00213

§ 371 Date: Oct. 8, 1997

§ 102(e) Date: Oct. 8, 1997

[87] PCT Pub. No.: WO96/23994

PCT Pub. Date: Aug. 8, 1996

[30] Foreign Application Priority Data

Feb. 1, 1995 [JP] Japan ................................ 7-015184

[51] Int. Cl.⁶ ............................. F16H 55/30; G05G 1/14; G05G 3/00
[52] U.S. Cl. ......................... 474/152; 74/594.2; 74/572; 188/264 A
[58] Field of Search ....................... 474/152, 165, 474/160, 162; 74/572, 594.1, 594.2, 594.3, 594.4; 188/218 XL, 264 A, 264 AA

[56] References Cited

U.S. PATENT DOCUMENTS

| | | | |
|---|---|---|---|
| 675,502 | 6/1901 | Thomas | 74/594.2 |
| 740,445 | 10/1903 | Langerfeld | 474/152 |
| 1,181,175 | 5/1916 | Shapiro | 474/152 |
| 1,595,925 | 8/1926 | Radnall | 74/594.2 |
| 4,793,208 | 12/1988 | Bregnard et al. | 74/594.3 |
| 5,044,226 | 9/1991 | Wu | 74/594.3 |
| 5,782,712 | 7/1998 | Campagnolo | 474/152 |

FOREIGN PATENT DOCUMENTS

| | | |
|---|---|---|
| 0 170 849 | 2/1986 | European Pat. Off. . |
| 963 346 | 7/1950 | France . |
| 311406 | 3/1919 | Germany . |
| 31 30 904 A1 | 2/1983 | Germany . |

*Primary Examiner*—Thomas R. Hannon
*Assistant Examiner*—Matthew A. Kaness
*Attorney, Agent, or Firm*—Armstrong, Westerman, Hattori, McLeland & Naughton

[57] ABSTRACT

A rotary member in the form of a sprocket or a brake disc for transmitting a drive force or brake force, the rotary member having an annular hub portion arranged on a center side, an annular ring portion arranged on an outer circumferential side, and a plurality of arm portions connecting the hub portion and the ring portion, with a plurality of weight reduction holes partitioned by the arm portions between the hub portion and the ring portion. The plurality of arm portions are provided so that centers of their distal end portions on the ring portion side and centers of their proximal end portions on the hub portion side are offset in one circumferential direction, respectively, and the hub portion and the ring portion are not directly connected to each other by longitudinal sectional lines that intersect with the arm portions in a radial direction of the rotary member.

4 Claims, 14 Drawing Sheets

SPROCKET AND BRAKE DISC HAVING A FUNCTION TO PREVENT A WARPAGE

BACKGROUND OF THE INVENTION

The present invention relates to a rotary member for transmitting a drive force or a braking force of a sprocket, a brake disc or the like.

In general, a mechanism having a pair of sprockets and a change laid therebetween has been widely used as a drive force transmission means in a motorcycle or a bicycle.

Usually, a sprocket is integrally formed of an annular hub portion arranged in the center thereof, an annular ring portion arranged in a circumferential portion thereof, and a plurality of arm portions extending radially and arranged between the hub portion and the ring portion for connecting the hub portion and the ring portion at a constant angular interval in the circumferential direction.

A carbon steel plate has been widely used as a material for the sprocket. In a manufacturing method, after the carbon steel plate has been machined to have a form of the sprocket by mechanical machining or pressing, a tooth portion is annealed to have a desired hardness. Thereafter, a finishing treatment is effected on the sprocket.

Figure 15:
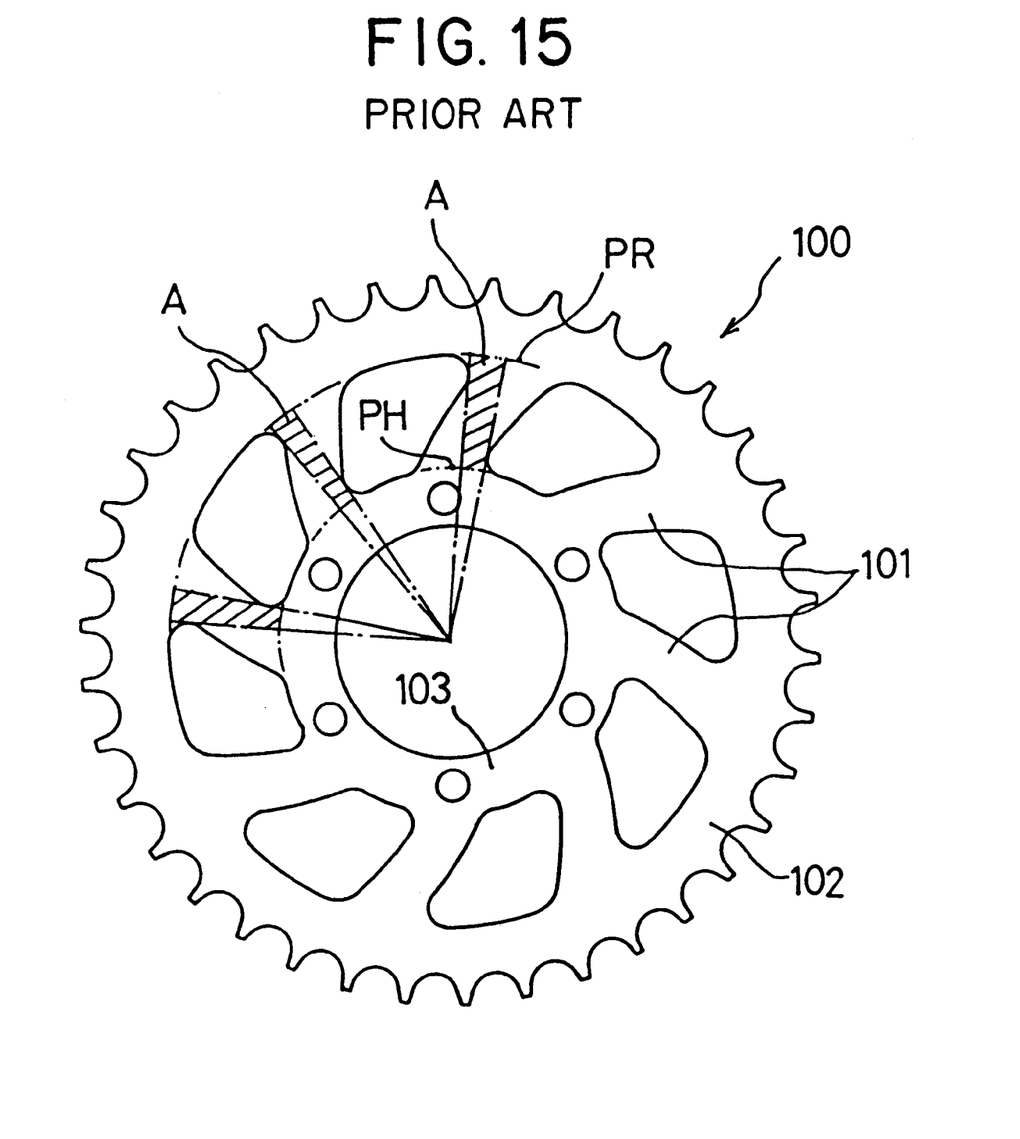
FIG. 15 is a frontal view showing a conventional sprocket.

Also, in view of an aesthetic design demand, there is a sprocket 100, as shown in FIG. 15, in which a center PR of a distal end portion on a ring portion 102 side and a center PH of a proximal end portion on a hub 103 side of each arm portion 101 are offset at a constant angle in the circumferential direction.

On the other hand, a brake disc in which an annular braking portion is formed in its outer circumferential portion and the braking portion clamped by pad members to generate the braking force has been extensively used as a braking mechanism in a motorcycle or the like.

A so-called floating disc brake mechanism has been widely practically used, in which a braking portion against which pad members are to be pressed and a disc like hub portion externaly fixedly mounted on an axle or the like are formed of discrete members, respectively; a plurality of pin members are mounted between the hub portion and the braking member; the braking portion is floatingly supported to the hub portion; and the braking portion and hub portions are slit at their edge to thereby prevent a warpage of the disc brake caused by heat generated during the braking operation.

Figure 16:
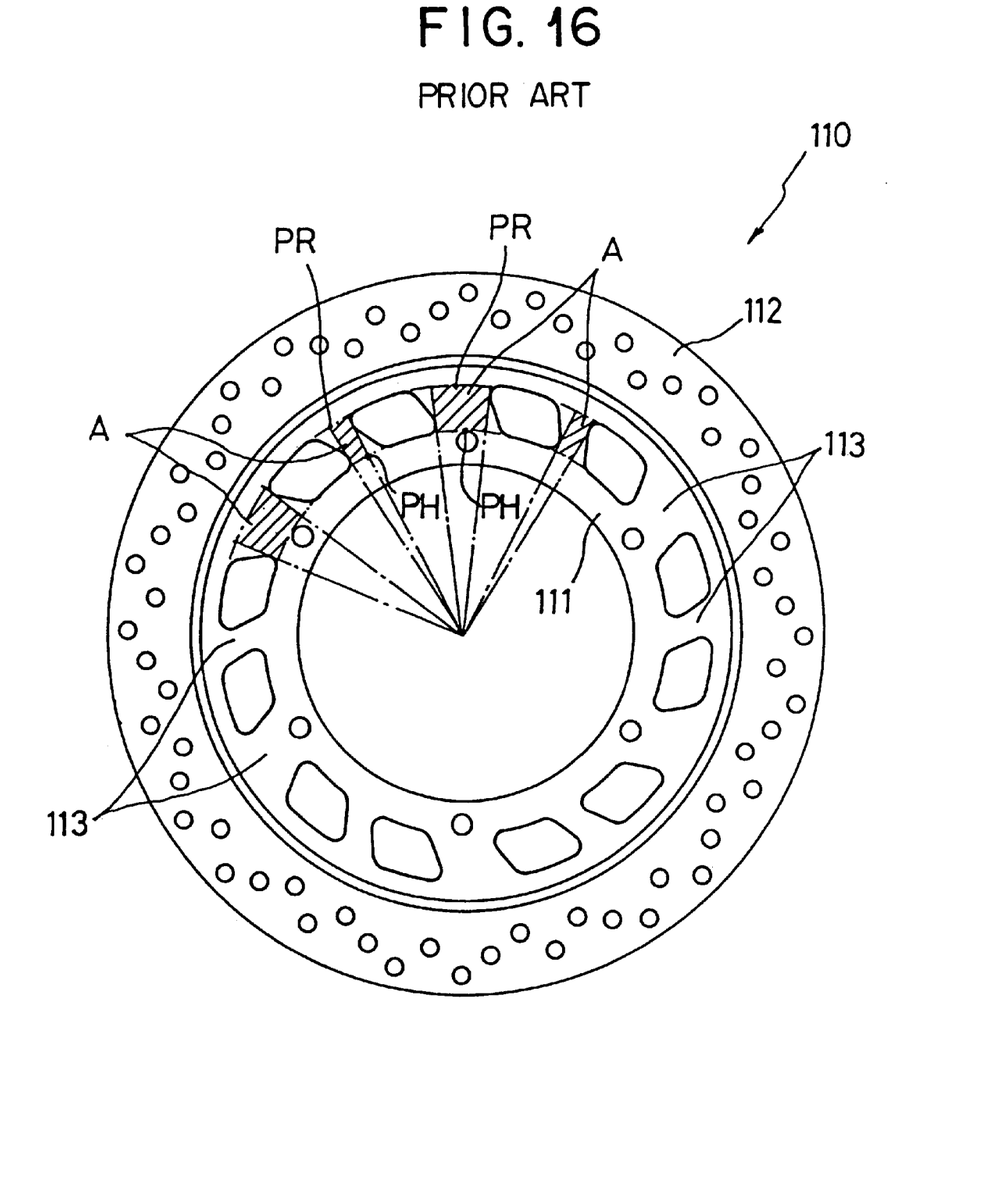
FIG. 16 is a frontal view showing a conventional brake disc.

Also, in a brake disc 110 as shown in FIG. 16, a hub portion 111 and a braking portion 112 are integrally formed with each other; the hub portion 111 and the braking portion 112 are coupled with each other through a plurality of arm portions 113; and in view of the aesthetic design demand, a center PR of a distal end portion on a braking portion 112 side and a center PH of a proximal end portion on a hub 111 side of each arm portion are offset in the circumferential direction with constant regularity.

In the sprocket in which the arm portions are radially arranged, after the annealing treatment for the tooth portion, the ring portion tends to shrink inwardly, but the hardness of the ring portion per se is high by the annealing treatment so that the shrinkage force is applied to the arm portions and the hub portion as a compression stress. Then, due to the compression stress, such a phenomenon that portions, corresponding to the arm portions, of the hub portion are deformed inwardly is generated. For this reason, after the annealing treatment of the tooth portion, a machining is effected to the inner circumferential surface of the hub portion. A cutting step is required to keep the inner circumferential surface in an exact circle. Thus, there is a disadvantage that the manufacturing steps for the sprocket are complicated.

Also, in order to solve this problem, it is possible to try to form the ring portion and the hub portion from discrete members like the braking portion and the hub portion of the floating disc brake. However, in this case, the number of the components is increased to raise the manufacturing cost corresponding to the additional components.

The present application made and tested various changes in shape of the arm portions and weight reduction holes on the basis of the concept that the compression stress applied to the hub portion was reduced by elastically deforming the arm portions. As a result, the present applicant has found out that the centers of the distal ends of the arm portions on the ring portion side and the centers of the proximal ends of the arm portions on the hub portion side are offset in one circumferential direction with a constant regularity, respectively, so that the deformation of the inner circumferential surface of the hub portion 102 may be reduced. Also, as shown in FIG. 15, even if the distal ends and the proximal ends of the arm portions 101 are offset in one circumferential direction with a constant regularity, if there are regions where the hub portion 102 and the ring portion 103 are directly connected with each other by longitudinal sectional lines intersecting with the arm portions 101 by hatching, it has been found that the deformation of the inner circumferential surface of the hub portion 102 is remarkable.

Namely, it has been found that not only in view of the design demand but also of the demand on the manufacture, the distal end portions and the proximal end portions of the arm portion are offset in one circumferential direction with a constant regularity, and in addition, the arm portions are formed so that the hub portion and the ring portion are not directly connected to each other by the longitudinal sectional lines intersecting with the arm portions in the radial direction of the sprocket, and in other words, the arm portions and the weight reduction holes are formed so that the lines in the radial direction of the sprocket are always kept to intersect with any weight reduction holes over the entire circumference of the sprocket, whereby it is possible to considerably reduce the deformation of the inner circumferential surface of the hub portion.

Also, even in a disc brake which is integrally made of a single steel plate, after the braking portion is annealed, there occurred a problem that is similar to that of the sprocket. In addition, due to the heat generation during the braking operation, the braking portion is expanded and a tension stress is effected at the arm portion so that the brake disc as a whole is subjected to the warpage. It is also found that the deformation of the inner circumferential surface of the hub portion or the warpage of the brake disc as a whole may be prevented in the same method. In the case where the ring portion is expanded due to the heat generation during the braking operation, this expansion is effectively absorbed by the arm portions.

SUMMARY OF THE INVENTION

An object of the present invention is to provide a rotary member in the form of a sprocket or brake disc for transmitting a drive force/brake force, which can reduce a compression stress or tension stress to be effected on a hub portion and can effectively prevent a deformation of an inner circumferential surface of the hub portion or a warpage of the rotary member without requiring any complicated structure for the rotary member.

According to the present invention, there is provided a force transmitting member as defined in claims 5 and 7, respectively, and the appended claims 6 and 8.

In the sprocket and brake disc for preventing warpage according to the present invention, since the plurality of arm portions are provided so that centers of their distal end portions on the ring portion side and centers of their proximal end portions on the hub portion side are offset in one circumferential direction, respectively, and the hub portion and the ring portion are not directly connected to each other by longitudinal sectional lines that intersect with the arm portions in a radial direction of the sprocket and brake disc, the expansion or shrinkage of the ring portion may be absorbed by the deformations of the arm portions and the weight reduction holes. Also, the weight reduction holes serve as spaces for allowing the elastic deformation of each arm portion and are deformed concomitant with the elastic deformation of the arm portion.

Namely, since the distal ends and the proximal ends of the arm portions are offset in one circumferential direction, even if the distance between the ring portion and hub portion is changed due to the expansion or shrinkage of the ring portion, the arm portions are elastically deformed with their distal ends being expanded or shrunk in the radial direction, so that the change in this distance is effectively absorbed. Also, in each portion of the full length of each arm portion, since the longitudinal lines are not directly connected to the hub portion and the ring portion, the tension stress or compression stress due to the expansion or shrinkage of the ring portions is positively prevented from being applied directly to the hub portion by the tension of the arm portions. In addition, the tension stress or shrinkage is effectively applied to the arm portions to accelerate the elastic deformation of the arm portions, so that the tension or compression stress to be applied to the hub portion is further effectively absorbed.

Also, if the centers of the distal end portions of the plurality of arm portions and the centers of the proximal ends thereof are offset in one circumferential direction, respectively, with a constant regularity, the expansion or shrinkage of the ring portions may be absorbed with a good balance by the plurality of arm portions.

Accordingly, in a sprocket having a function to prevent a warpage, the shrinkage into inside of the ring portion due to the annealing treatment to the tooth portions is effectively absorbed and the deformation of the inner circumferential surface of the hub may be prevented. Also, in a brake disc having a function to prevent a warpage, in the case way as in the case of the sprocket, the shrinkage into inside of the ring portion due to the annealing treatment to the braking portions is effectively absorbed and the deformation of the inner circumferential surface of the hub may be prevented. Even if the ring portion is expanded due to heat generation at brake operation, the arm portions are elastically deformed to absorb the change in distance between the ring portion and the hub portion due to the expansion, thus effectively preventing the warpage of the brake disc.

PREFERRED EMBODIMENT OF THE INVENTION

Embodiments of the invention will now be described with reference to the accompanying drawings.

<First Embodiment>

A first embodiment is directed to a case where the present invention is applied to a sprocket for a torque transmission in a motorcycle.

Figure 1:
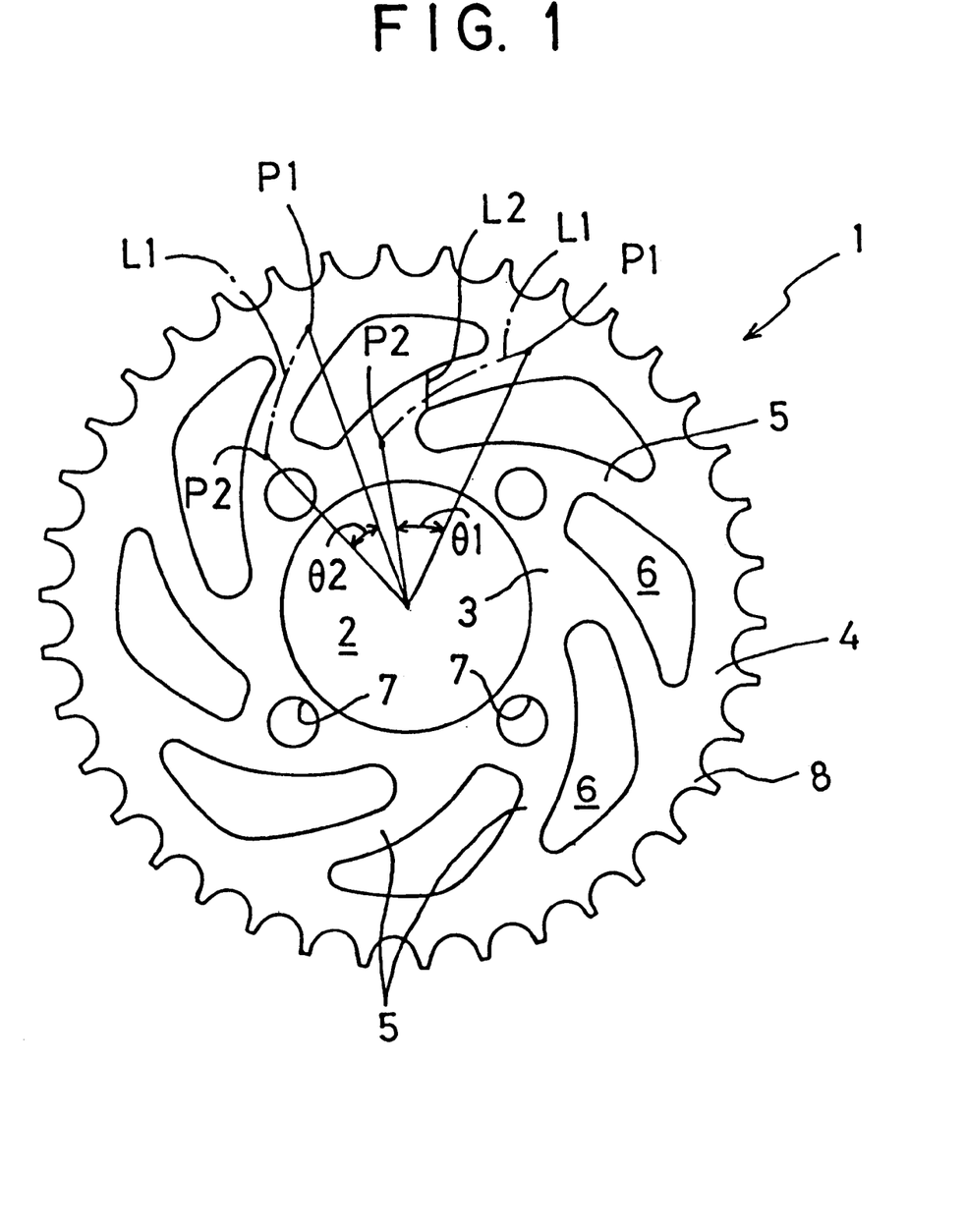
FIG. 1 is a frontal view of a sprocket according to the invention.

As shown in FIG. 1, a sprocket 1 is externally mounted on and fixed to a wheel hub shaft of a transmission (not shown) with bolts. The sprocket 1 has a hub portion 3 having an engagement hole 2 through which the wheel hub shaft is caused to centrally pass, an annular ring portion 4 on its outer circumferential side, and eight arm portions 5 each connecting the hub portion 3 and the ring portion 4 at a constant interval along the circumference. The sprocket 1 is integrally formed of a carbon steel plate.

Weight reducing holes 6 and the arm portions 5 are alternatively formed between the ring portion 4 and the hub portion 3. Four mounting holes 7 for fastening the sprocket 1 are formed in the vicinity of the proximal ends of the arm portions 5 in the hub portion 3. A plurality of tooth portions 8 are formed in the outer circumferential portion of the ring portion 4. The tooth portions 8 are subjected to a heat treatment so that they have a hardness in the range of 35 to 55 in terms of Rockwll C. Namely, after the sprocket 1 is worked in the form of a sprocket 1 by machining or pressing the carbon steel plate, the annealing treatment is applied to the tooth portions 8 or the tempering treatment is applied thereto after the annealing treatment.

The eight arm portions 5 are formed in gentle curves as shown in FIG. 1, and are alternatively arranged to be offset at offset angles θ1 and θ2 in one circumferential direction relative to the center P1 of the distal end on the ring portion 4 side and the center P2 of the proximal end on the hub portion 3 side. The centerline L1 of each arm portion 5 is arranged to be obliquely in one direction relative to lines extending radially of the sprocket 1 and intersecting with the arm portion 5. Also, each arm portion 5 is arranged so that the hub portion 3 and the ring portion 4 are not directly connected to each other by a longitudinal sectional line L2 which intersects with the arm portion 5 in the radial direction of the sprocket 1. In other words, each arm portion 5 is arranged so that the line extending in the radial direction of the sprocket 1 is always crossed with any weight reduction hole 6 over the entire circumference of the sprocket 1.

The operation of the sprocket 1 will now be described.

Figure 2:
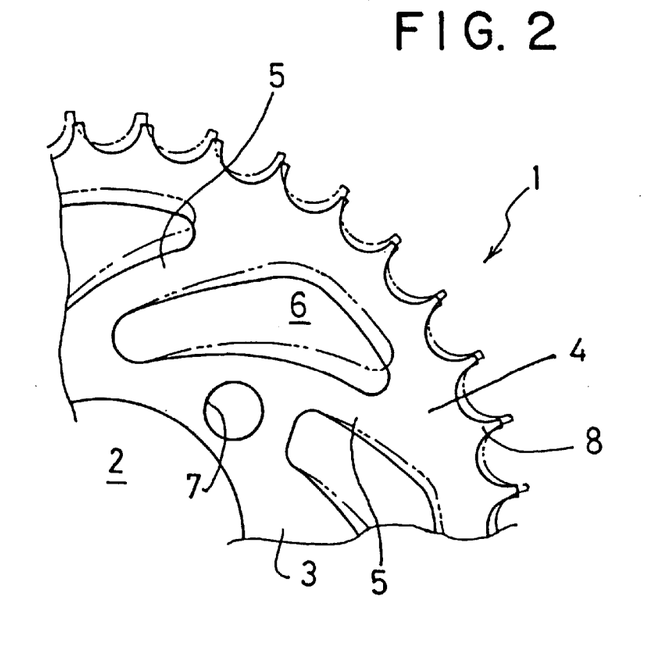
FIG. 2 is a view showing an operation of the sprocket.
Figure 3:
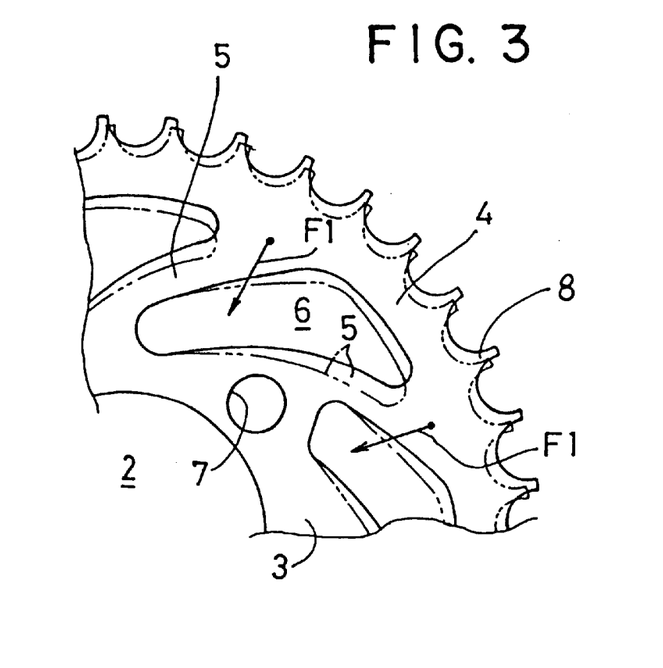
FIG. 3 is a view showing another operation of the sprocket.

Since the center P1 at the distal end and the center P2 at the proximal end of each arm portion 5 are offset at offset angles θ1 and θ2 in one circumferential direction relative to each other, and each arm portion 5 is oblique relative to the line in the radial direction of the sprocket, the expansion of the ring portion 4 in the radial direction is absorbed by the elastic deformation of the arm portion 5 as indicated by phantom lines in FIG. 2, whereas the shrinkage of the ring portion 4 in the radial direction is absorbed by the elastic deformation of the arm portion 5 as indicated by phantom lines in FIG. 3. Incidentally, the weight reduction holes 6 serve as spaces for allowing the elastic deformation of each arm portion 5 and are deformed concomitant with the elastic deformation of the arm portion 5.

Also, in each portion of the overall length of each arm portions 5, since the longitudinal sectional line L2 will not be connected directly to the hub portion 3 and the ring portion 4, in the expansion or shrinkage of the ring portion 4, the tension stress or compression stress due to the expansion or shrinkage of the ring portion 4 by the expansion of the arm portion 5 is positively prevented from being applied to the hub portion 3, and in addition, the tension stress or shrinkage stress is effectively applied to the arm portion 5 to accelerate the elastic deformation of the arm portion 5 and to further effectively absorb the tension stress or compression stress to be applied to the hub portion 3.

Namely, during the manufacture of the sprocket 1, even if the ring portion 4 is shrunk by the heat treatment applied to the tooth portions 8 and the compression stress F1 in the radial direction is applied to the arm portions 5 as shown in FIG. 3, the compression stress F1 is absorbed by the deformation of the arm portions 5 and the weight reduction holes 6.

For this reason, the compression stress applied to the hub portion 3 is reduced to thereby prevent the deformation of the hub portion 3 toward the center. Even if any mechanical work is not applied thereto after the heat treatment, it is possible to obtain a sufficient exactness of a circular property of the engagement hole 2.

A modification will now be described in which the structure of the above-described sprocket 1 is partially changed so that all the weight reduction holes have the same shape to thereby simplify the punching step. It should be noted that the same reference numerals are used to indicate like members or components and details of the explanation therefor will be omitted.

Figure 4:
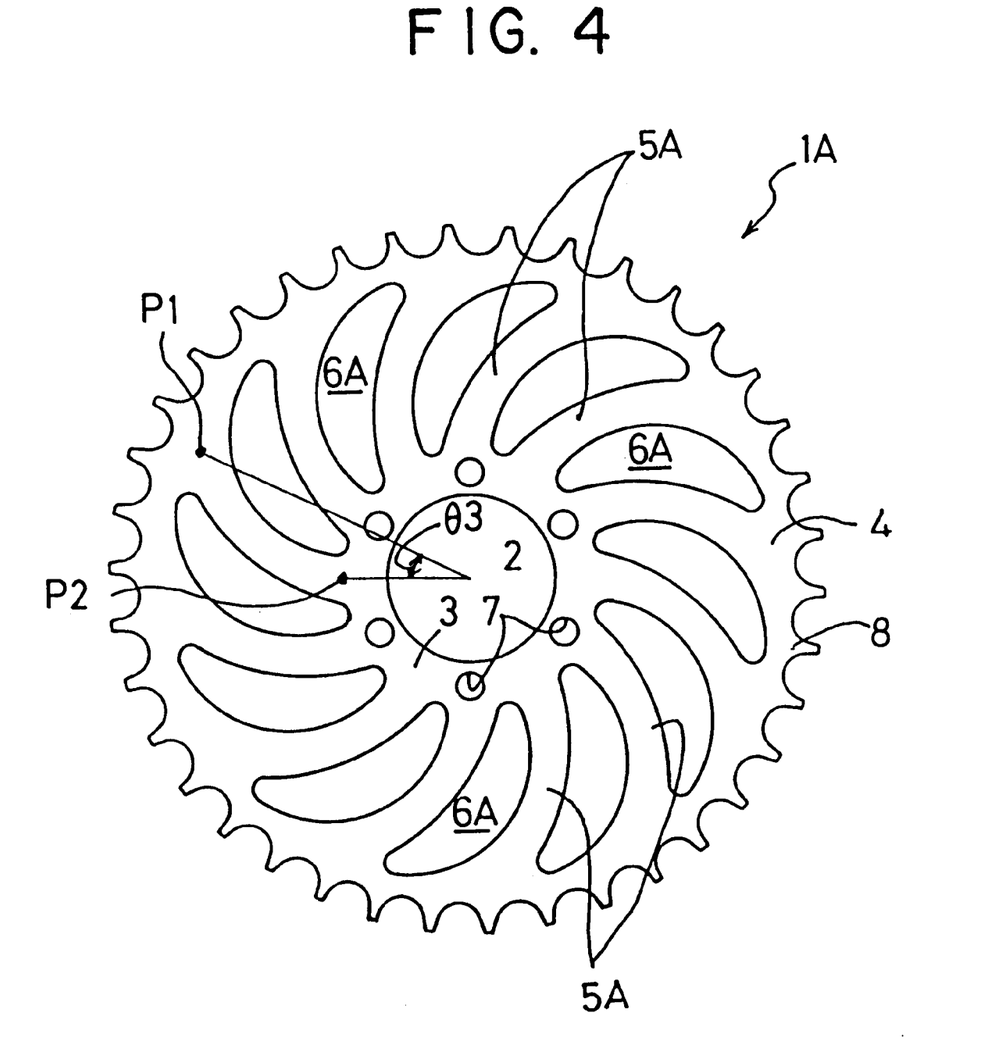
FIG. 4 is a frontal view showing a sprocket having another structure.

(1) In a sprocket 1A as shown in FIG. 4, the mounting holes 7 are arranged inside the end portions toward the central side of the weight reduction holes 6A, the centers P1 of the distal end portions and the centers P2 of the proximal end portions of the twelve arm portions 5A are offset at a constant angle θ3 in one circumferential direction, and the arm portion 5A are provided in curves so that the weight reduction holes 6A are formed to have crescent shape.

Figure 5:
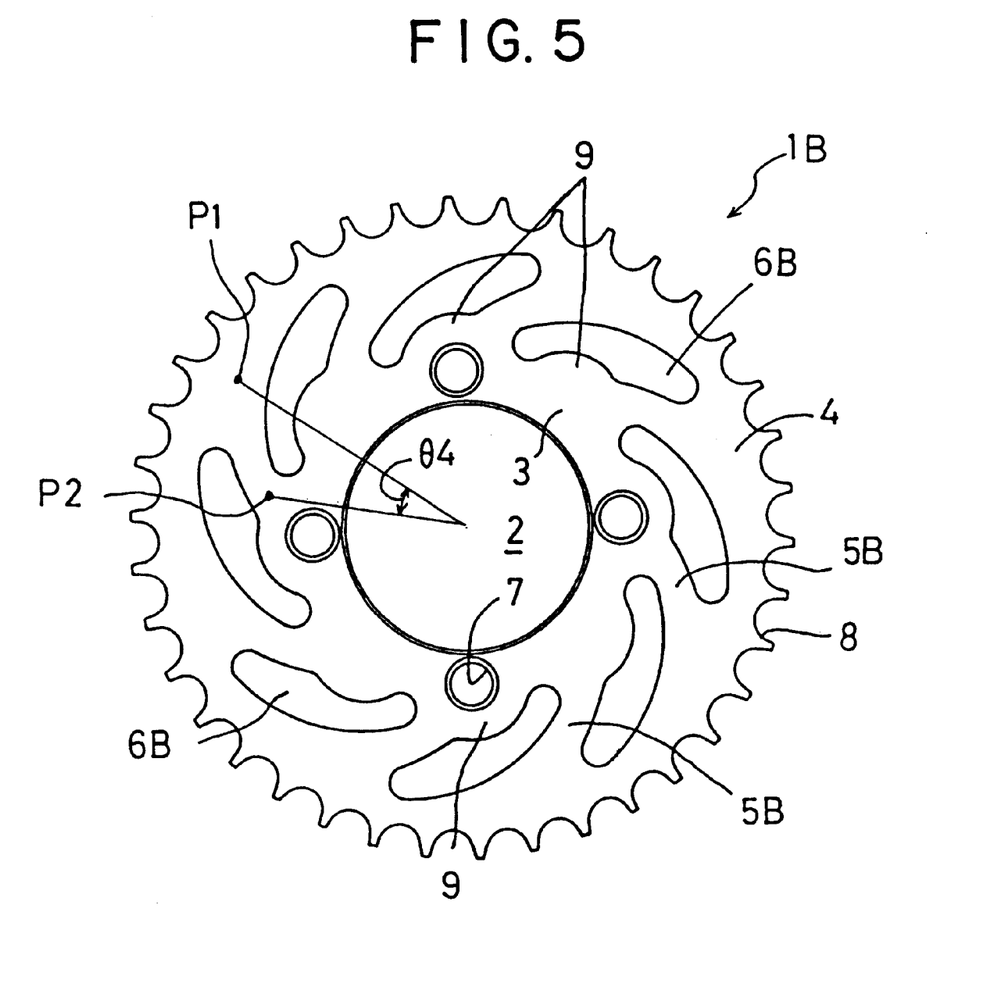
FIG. 5 is a frontal view showing a sprocket having another structure.

(2) In a sprocket 1B as shown in FIG. 5, expansion portions 9 are formed on the proximal end portions of the eight arm portions 5B, respectively, the centers P1 of the distal end portions and the centers P2 of the proximal end portions of the eight arm portions 5B are offset at a constant angle θ4 in one circumferential direction, and the mounting holes 7 are formed for every two expansion portions 9 so that the eight weight reduction holes 6B are all formed in the same shape.

Figure 6:
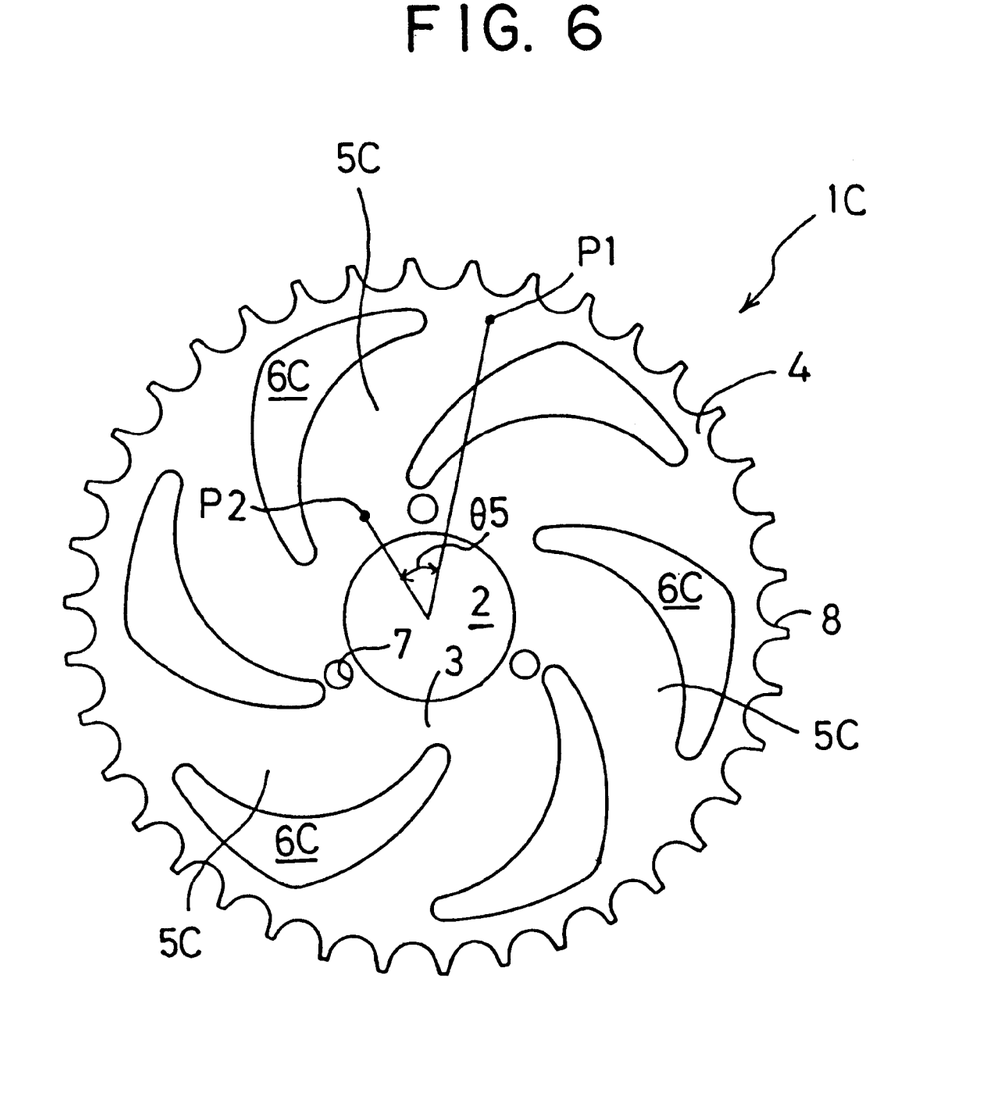
FIG. 6 is a frontal view showing a sprocket having another structure.

(3) In a sprocket 1C as shown in FIG. 6, the mounting holes 7 are arranged inside the end portions toward the central side of the weight reduction holes 6C, the centers P1 of the distal end portions and the centers P2 of the proximal end portions of the six arm portions 5C are offset at a constant angle θ5 in one circumferential direction, and the arm portion 5C are provided in curves so that the weight reduction holes 6A are substantially formed to have boomerang shape.

Figure 7:
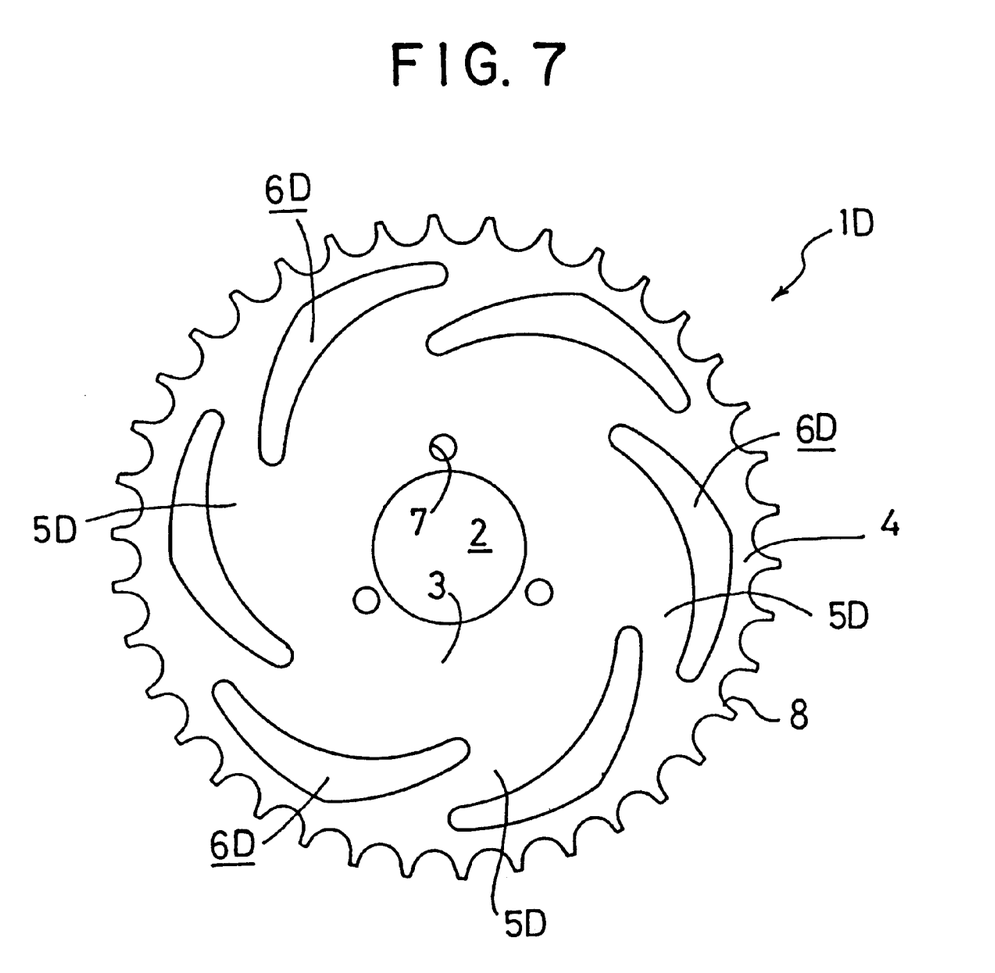
FIG. 7 is a frontal view showing a sprocket having another structure.

(4) In a sprocket 1D as shown in FIG. 7, substantially boomerang-shaped weight reduction holes 6D are arranged outside the weight reduction holes 6C of the sprocket 1C and the hub portion 3 and the ring portion 4 are connected by arm portions 5D.

Figure 8:
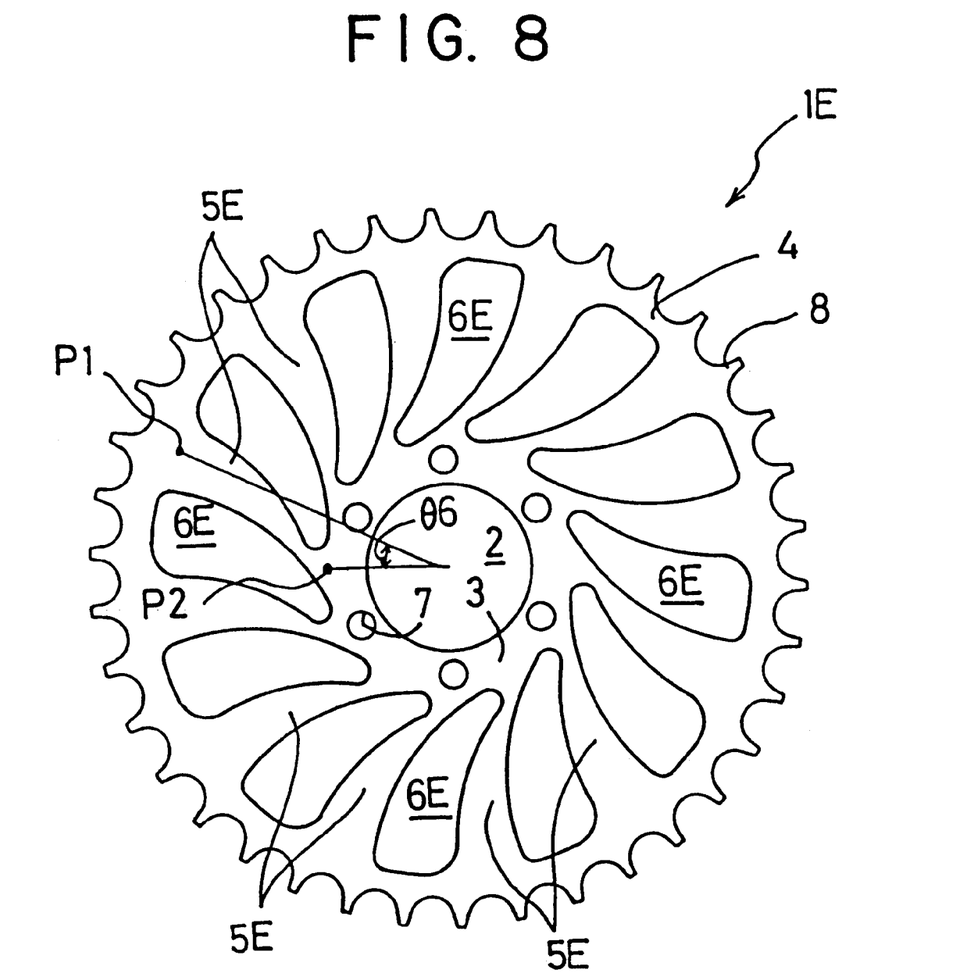
FIG. 8 is a frontal view showing a sprocket having another structure.

(5) In a sprocket 1E as shown in FIG. 8, the mounting holes 7 are arranged inside the end portions toward the central side of the weight reduction holes 6E, the centers P1 of the distal end portions and the centers P2 of the proximal end portions of the twelve arm portions 5E are offset at a constant angle θ6 in one circumferential direction, and the curved direction of the arm portions 5E are opposite to the curved direction of the arm portions 5 of the previous embodiment so that a width of the arm portions 5E is gradually increased from the proximal end to the distal end thereof.

Figure 9:
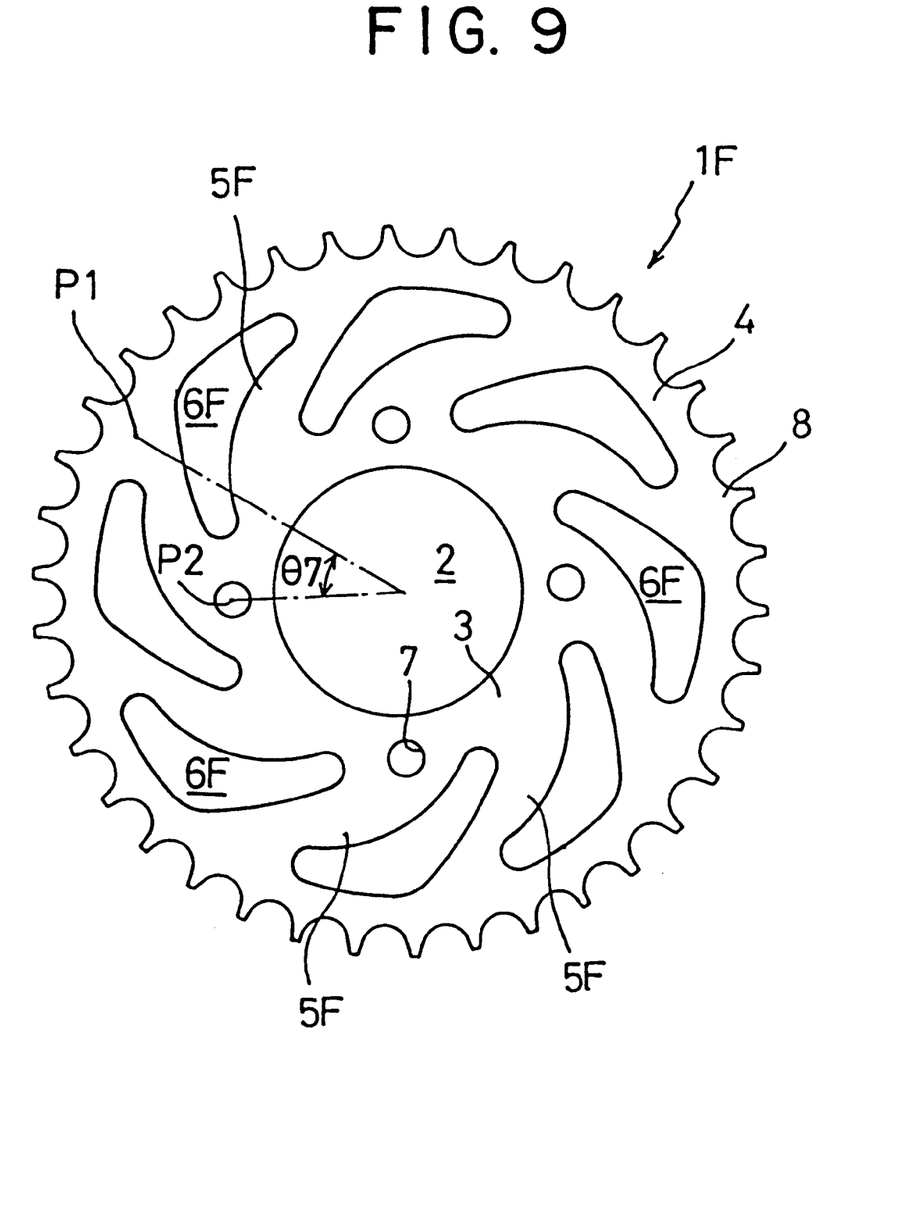
FIG. 9 is a frontal view showing a sprocket having another structure.

(6) In a sprocket 1F as shown in FIG. 9, the centers P1 of the distal end portions and the centers P2 of the proximal end portions of eight arm portions 5F are offset at a constant angle θ7 in one circumferential direction, a width of the proximal end portions of the arm portions 5F is set at a large one, the mounting holes 7 are formed for every two of the eight arm portions 5F so that the mechanical strength of the arm portions 5F is kept at a high level, and the shape of the eight weight reduction holes 6F may be the same.

Figure 10:
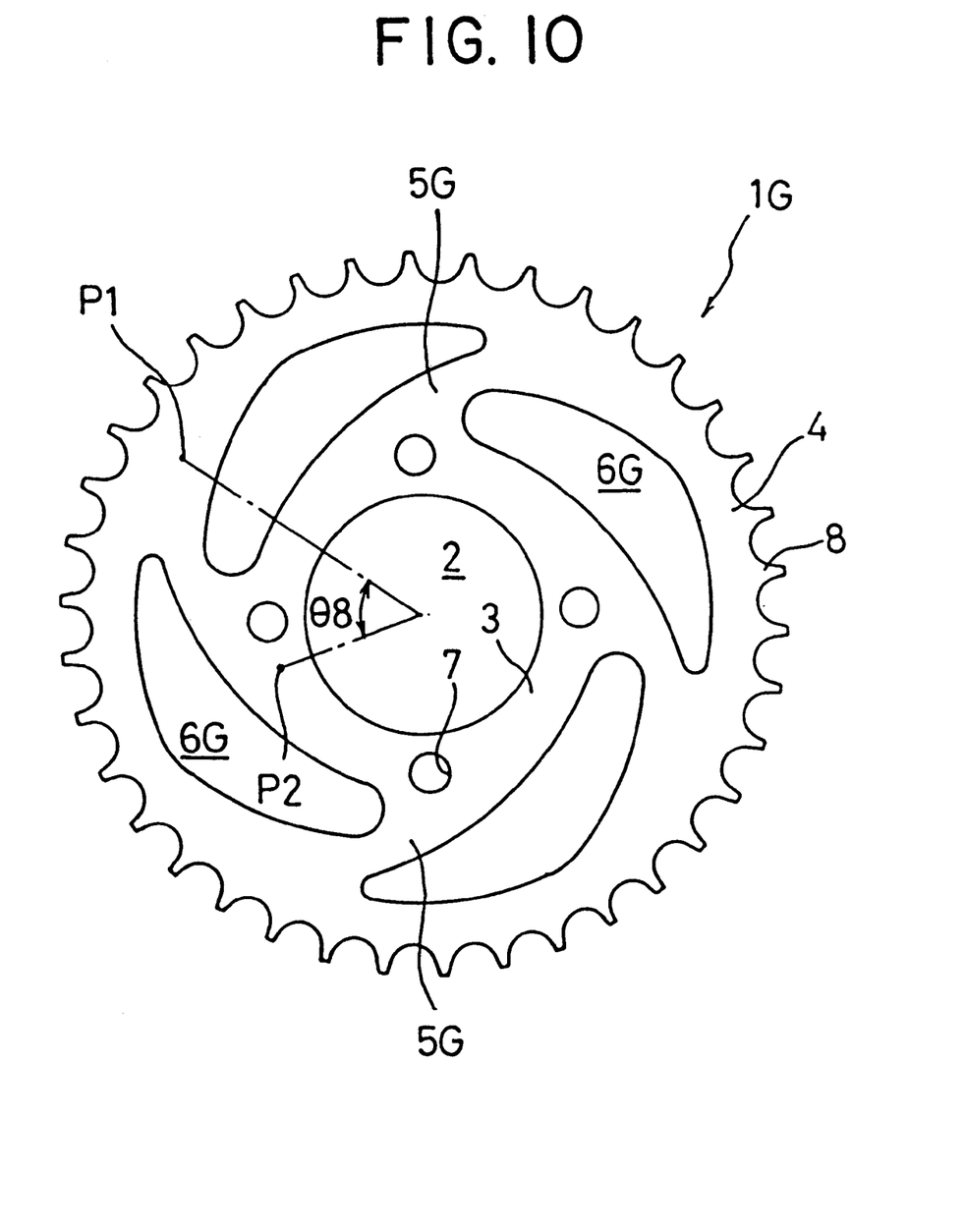
FIG. 10 is a frontal view showing a sprocket having another structure.

(7) In a sprocket 1G as shown in FIG. 10, the centers P1 of the distal end portions and the centers P2 of the proximal end portions of four arm portions 5G are offset at a constant angle θ8 in one circumferential direction, a width of the proximal end portions of the arm portions 5G is set at a large one, the mounting holes 7 are formed at the proximal end portions of the four arm portions 5G so that the mechanical strength of the arm portions 5G is kept at a high level, and the shape of the four weight reduction holes 6G may be the same.

Incidentally, it is possible to set the number of the arms 5, 5A through 5G as desired in response to the size of the sprocket 1, 1A to 1G.

In the foregoing embodiment, the invention is applied to the sprockets 1, 1A to 1G of the torque transmission system of the motorcycle. It is however apparent that the present invention may be applied to any other sprockets of a rotational transmission system than that of the driving torque transmission and also may be applied to a sprocket in a rotation transmission and also may be applied to a sprocket in a rotation transmission system of equipment or apparatus other than the motorcycle.

<Second Embodiment>

A second embodiment is directed to a case where the present invention is applied to a brake disc of a braking mechanism in a motorcycle.

Figure 11:
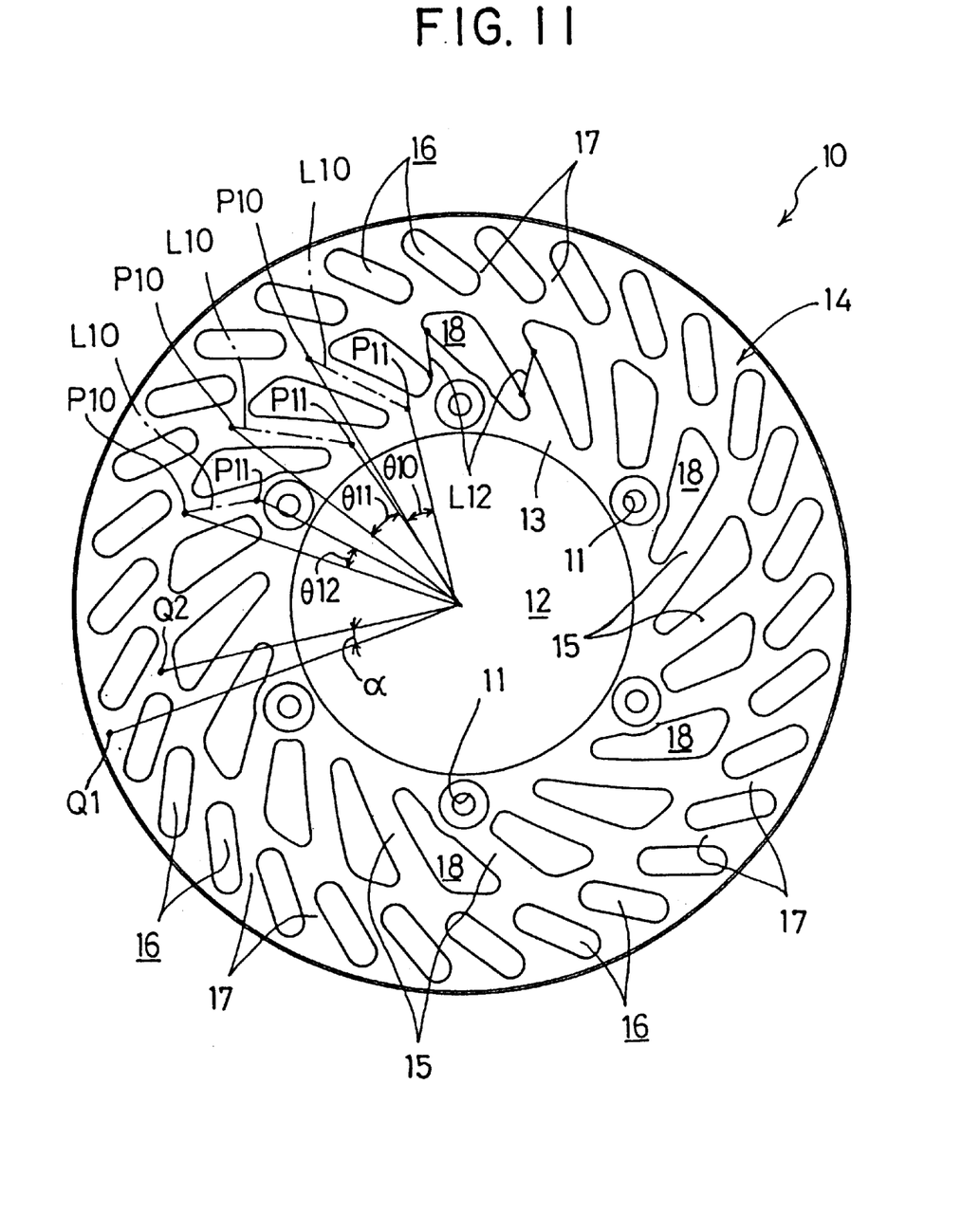
FIG. 11 is a frontal view of a brake disc according to the invention.

As shown in FIG. 11, a brake disc 10 is externally mounted on and fixed to a wheel hub shaft (not shown) with bolts. The brake disc 11 has a hub portion 13 having an engagement hole 12 through which the automotive axle is caused to pass, an annular braking portion 14 (corresponding to the ring portion) on its outer circumferential side, and a plurality of arm portions 15 each connecting the hub portion 13 and the braking portion 14 at a constant interval along the circumference. The disc brake 10 is integrally formed of a carbon steel plate. It is to be noted that the number of the arm portions 15 may be selected to any one other than that shown in the figure.

A plurality of slits 16 are formed at a constant interval in order to enhance the braking force. Centers Q1 of the outer distal end side of the connecting portions 17 arranged between the slits 16 are arranged to be offset in the circumferential direction by a constant angle α relative to inside centers Q2 of the proximal ends. Incidentally, instead of the plurality of slits 16, a plurality of round holes may be arranged to enhance the braking force.

Weight reduction holes 18 and the arm portions 15 are alternately formed between the braking portion 14 and the hub portion 13, and the mounting holes 11 for fastening the brake disc 10 are formed for every three arm portions 15 at the hub portion 13 in the vicinity of the proximal ends of the arm portions 15.

The plurality of arm portions 15 are formed as shown in FIG. 11, and the centers P10 of the distal ends on the braking portion 14 side and the centers P11 of the proximal ends on the hub portion 13 side are repeatedly arranged to be offset at offset angles θ10, θ11 and θ12 in this order in one circumferential direction. The centerline L1 of each arm portion 15 is arranged to be obliquely in one direction relative to lines extending radially of the brake disc 10 and intersecting with the arm portion 15. Also, each arm portion 15 is arranged so that the hub portion 13 and the braking portion 14 are not directly connected to each other by a longitudinal sectional line L2 which intersects with the arm portion 15 in the radial direction of the brake disc 10 at each portion of the entire length of each arm portion 15.

The operation of the disc brake 10 will now be described.

Figure 12:
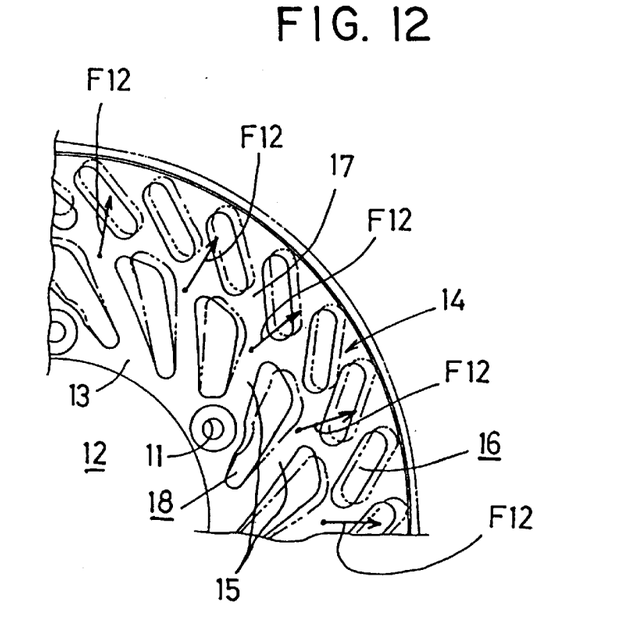
FIG. 12 is a view showing an operation of a brake disc according to the invention.
Figure 13:
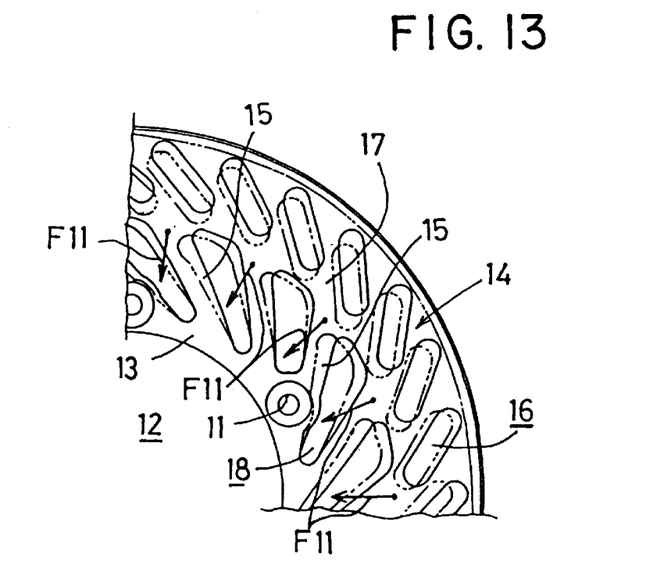
FIG. 13 is a view showing another operation of a brake disc according to the invention.

Since the centers P10 of the distal ends and the centers P11 of the proximal ends of the arm portions 15 are repeatedly arranged to be offset at offset angles in the order of θ10, θ11 and θ12 in one circumferential direction, and each arm portion 15 is arranged to be obliquely in one direction relative to the radial direction of the brake disc 10, the expansion of the braking portion 14 in the radial direction is absorbed by the elastic deformation of the arm portion 15 as indicated by phantom lines in FIG. 12, whereas the shrinkage of the braking portion 14 in the radial direction is absorbed by the elastic deformation of the arm portion 15 as indicated by phantom lines in FIG. 13. Incidentally, the weight reduction holes 18 serve as spaces for allowing the elastic deformation of each arm portion 15 and are deformed concomitant with the elastic deformation of the arm portion 15.

Also, in each portion of the entire length of each arm portions 5, since the longitudinal sectional line L2 will not be connected directly to the hub portion 13 and the braking portion 14, in the expansion or shrinkage of the braking portion 14, the tension stress or compression stress due to the expansion or shrinkage of the braking portion 14 by the expansion of the arm portion 15 is positively prevented from being applied to the hub portion 13, and in addition, the tension stress or compression stress is effectively applied to the arm portion 15 to accelerate the elastic deformation of the arm portion 15 and to further effectively absorb the tension stress or compression stress to be applied to the hub portion 13.

Namely, even if, during the manufacture of the brake disc 10, the braking portion 14 is shrunk by the heat treatment applied to the braking portion 14 and the compression stress F11 in the radial direction is applied to the arm portions 15 as shown in FIG. 13, the compression stress F11 is absorbed by the deformation of the arm portions 15 and the weight reduction holes 18.

For this reason, the compression stress applied to the hub portion 13 is reduced to thereby prevent the deformation of the hub portion 13 toward the center. Even if any mechanical work is not applied thereto after the heat treatment, it is possible to obtain a sufficient exactness of a circular property of the engagement hole 12.

Also, even if the braking portion 14 is expanded by the heat generation in the braking operation and the tension stress F12 in the radial direction is applied to the arm portions 15 as shown in FIG. 12, the tension stress F12 is absorbed by the deformation of the arm portions 15 and the weight reduction holes 18. For this reason, even if the braking portion and the hub portion are not made of discrete members as in the brake disc of the floating disc brake mechanism, it is possible to positively prevent the warpage of the brake disc 10 in the braking operation, and to remarkably reduce the cost of the brake disc 10 while keeping with sufficient performance in the braking operation.

Figure 14:
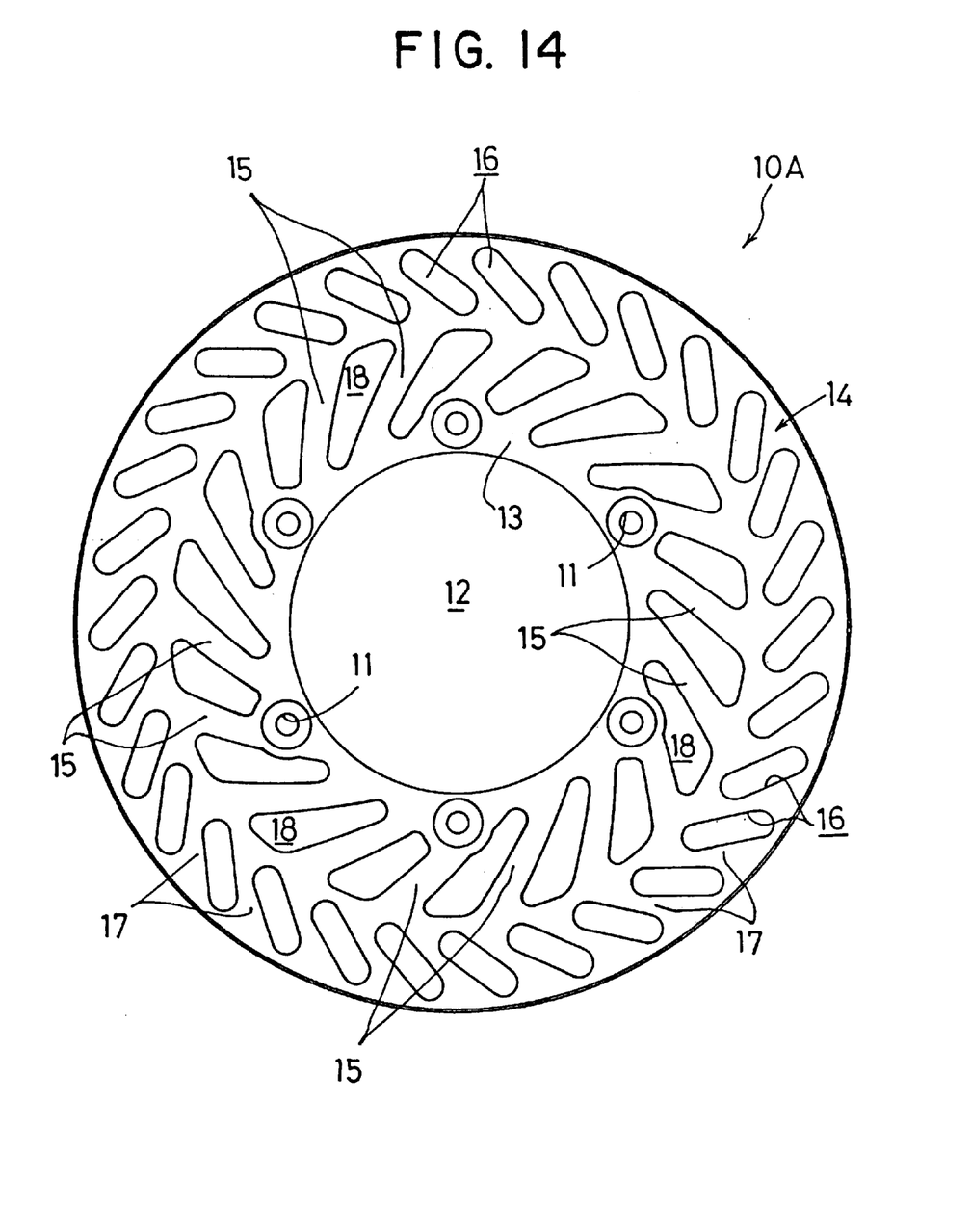
FIG. 14 is a frontal view showing a disc brake having another structure.

Incidentally, in a modification of the second embodiment, it is possible to set the oblique directions of the connecting portion 17 and the arm portion 15 in the opposite direction in a brake disc 10A as shown in FIG. 14. Also, it is possible to adopt the arm portions 15 and the weight reduction holes as shown in the above-described sprockets 1, 1A to 1G for the arm portions 15 and the weight reduction holes 18.

Incidentally, in the first and second embodiments, the present invention has been applied to the sprockets and the brake discs. However, the present invention may be equally applied to a clutch disc or the like a rotary member for transmitting the braking force and drive force.

With the sprocket and the brake disc having a function to prevent a warpage according to the present invention, it is possible to effectively absorb the expansion or shrinkage of the ring member and to prevent the warpage of the sprocket and the brake disc or deformation of the inner circumferential surface of the hub portion without increasing the number of the components with a simple structure in which the shapes of the arm portions and the weight reduction holes are changed.

Also, if the centers of the distal end portions of the plurality of arm portions and the centers of the proximal ends thereof are offset in one circumferential direction, respectively, with a constant regularity, the expansion or shrinkage of the ring portions may be absorbed with a good balance by the plurality of arm portions, and it is possible to further effectively absorb the warpage of the sprocket and the brake disc or deformation of the inner circumferential surface of the hub portion.

For this reason, in a sprocket for preventing warpage, the shrinkage of the ring portion due to the annealing treatment to the tooth portions is effectively absorbed and the deformation of the inner circumferential surface of the hub may be prevented. The machine work to the inner circumferential surface of the hub portion after the annealing treatment may be dispensed with and the sprocket manufacturing step may be simplified. In addition, since the sprocket is composed of a single member, its manufacturing cost is less expensive.

Also, in a brake disc for preventing warpage, in the case way as in the case of the sprocket, the shrinkage of the ring portion due to the annealing treatment to the braking portions is effectively absorbed and the deformation of the inner circumferential surface of the hub may be prevented. The machine work to the inner circumferential surface of the hub portion may be dispensed with and the brake disc manufacturing step may be simplified. In addition, also in the case where the ring portion is expanded due to the heat generation during the braking operation, this expansion is effectively absorbed by the arm portions. Accordingly, it is possible to effectively prevent the generation of the warpage even in the brake disc made of a single member and to enhance the performance of the brake disc while considerably reducing the manufacturing cost thereof without such a structure that the braking portion and the hub portion are made of discrete members like the brake disc of the floating disc brake mechanism.

What we claim is:

1. A force transmitting member in the form of a sprocket for preventing warpage, said sprocket comprising a flat plate member which has an annular hub portion (3) arranged on a center side, an annular ring portion (4) arranged on an outer circumferential side, which ring portion is provided with a plurality of teeth along an outer circumferential portion thereof, a plurality of arm portions (5) connecting the hub portion and the ring portion, said hub, ring and arm portions being arranged as one piece forming said flat plate member without uneven side surfaces and, a plurality of weight reduction holes (6) partitioned by adjacent arm portions, an inner portion of said ring portion and an outer portion of said hub portion, wherein said plurality of arm portions (5) are provided such that centers (P1) of their distal end portions on the side of the ring portion and the centers (P2) of their proximal end portions on the side of the hub portion are offset in one circumferential direction, respectively, and said plurality of arm portions are provided in a substantially straight form so that said hub portion (3) and said ring portion (4) are not directly connected to each other by longitudinal sectional lines (L2) that intersect with the arm portions in a radial direction of said sprocket and intersect with said weight reduction holes (6).

2. The sprocket of claims 1, wherein said plurality of arm portions (5) are provided such that the centers (P1) of their distal end portions on the side of the ring portion (4) and the center (P2) of their proximal end portions on the side of the hub portion (3) are offset in one circumferential direction with a constant regularity, respectively.

3. A force transmitting member in the form of a brake disc for preventing warpage, said brake disc comprising a flat plate member which has an annular hub portion (13) arranged on a center side, a brake portion (14) on an annular ring portion arranged on an outer circumferential side, and a plurality of arm portions (15) connecting the hub portion and the brake portion, said hub, braking and arm portions being arranged as one piece forming said flat plate member without uneven side surfaces and, a plurality of weight reduction holes (18) partitioned by adjacent arm portions, an inner portion of said braking portion and an outer portion of said hub portion, wherein said plurality of arm portions (15) are provided such that centers (P10) of their distal end portions on the side of the braking portion (14) and the centers (P11) of their proximal end portions on the side of the hub portion (13) are offset in one circumferential direction, respectively, and said plurality of arm portions (15) are provided in a substantially straight form so that said hub portion (13) and said braking portion (14) are not directly connected to each other by longitudinal sectional lines (L12) that intersect with the arm portions (15) in a radial direction of said brake disc and intersect with said weight reduction holes (18).

4. The brake disc of claim 3, wherein said plurality of arm portions (15) are provided such that the centers (P10) of their distal end portions on the side of the braking portion (14) and the centers (P2) of their proximal end portions on the side of the hub portion (13) are offset in one circumferential direction with a constant regularity, respectively.

* * * * *